United States Patent [19]

Tsumura et al.

[11] Patent Number: 5,521,259
[45] Date of Patent: May 28, 1996

[54] PROCESS FOR PRODUCING HIGHLY REACTIVE MODIFIED PHENOLIC RESIN

[75] Inventors: Masahiro Tsumura; Masao Tashima; Hiromi Miyasita, all of Kamisu-machi, Japan

[73] Assignee: Kashima Oil Co., Ltd., Tokyo, Japan

[21] Appl. No.: 377,347

[22] Filed: Jan. 24, 1995

[30] Foreign Application Priority Data

Jan. 27, 1994 [JP] Japan ................... 6-023617

[51] Int. Cl.$^6$ .................. C08L 61/04; C08L 59/02; C08L 59/04
[52] U.S. Cl. .................. 525/481; 525/480; 528/155
[58] Field of Search ..................... 525/481, 480; 528/155

[56] References Cited

FOREIGN PATENT DOCUMENTS

| 0612776 | 8/1994 | European Pat. Off. . |
|---|---|---|
| 61-235413 | 10/1986 | Japan . |
| 2-229823 | 9/1990 | Japan . |
| 2-274714 | 11/1990 | Japan . |
| 3-247616 | 11/1991 | Japan . |
| 4-145116 | 5/1992 | Japan . |
| 4-142359 | 5/1992 | Japan . |
| 4-250034 | 9/1992 | Japan . |
| 4-348933 | 12/1992 | Japan . |
| 5-16276 | 1/1993 | Japan . |

OTHER PUBLICATIONS

Patent Abstracts of Japan, vol. 155, P–1562, JP–5–40646, Feb. 19, 1993.
PTO translation of Japan, Kokai 04–145116, pub. date: Apr. 19, 1992.
PTO translation of Japan, Kokai 02–274,714, pub. date: Nov. 8, 1990.

*Primary Examiner*—W. Robinson H. Clark
*Attorney, Agent, or Firm*—Oblon, Spivak, McClelland, Maier & Neustadt

[57] ABSTRACT

A process for producing a highly reactive modified phenolic resin, comprising the steps of polycondensing a petroleum heavy oil or pitch, a formaldehyde polymer and a phenol in the presence of an acid catalyst to thereby prepare a modified phenolic resin; and reacting the resultant modified phenolic resin with a phenol in the presence of an acid catalyst but in the absence of a crosslinking agent such as a formaldehyde polymer to thereby lower the molecular weight of the modified phenolic resin. This highly reactive modified phenolic resin has a low number average molecular weight and a high phenol content, so that its resin melt viscosity is low and that it exhibits a markedly improved reactivity with an epoxy resin. Accordingly, the combination thereof with an epoxy resin provides a molding material suitable for producing a molding which is excellent in not only thermal resistance and moldability but also dimensional stability and other mechanical properties, especially a material for electrical or electronic part and a semiconductor sealer.

9 Claims, No Drawings

PROCESS FOR PRODUCING HIGHLY REACTIVE MODIFIED PHENOLIC RESIN

FIELD OF THE INVENTION

The present invention relates to a process for producing a modified phenolic resin which is not only excellent in moldability but also combinable with an epoxy resin to thereby from a molding material excellent in dimensional stability, strength and other mechanical properties as well as in thermal, moisture and corrosion resistance. Also, the present invention relates to a molding material based on modified phenolic resin comprising the modified phenolic resin obtained by the above process and an epoxy resin, especially a material for electrical or electronic part and a semiconductor sealer.

BACKGROUND OF THE INVENTION

The phenolic resin provides a molding excellent in mechanical properties, and hence has widely been employed from old either independently or in the form of a blend with another resin, such as an epoxy resin. However, the phenolic resin per se and blend have drawbacks in that the light and alkali resistance is relatively low, that they are likely to absorb water or an alcohol to thereby suffer from changes in the dimension and electrical resistance, and that the thermal resistance, especially the oxidation resistance at high temperatures, thereof is poor.

In order to overcome the drawbacks, various modifications of the phenolic resin have been studied. For example, various modified phenolic resins have been proposed, which have improved resistance to deterioration and oxidation due to light, chemicals, etc. by virtue of the modification using a fat, an oil, a rosin or a neutral aromatic compound.

Among the various proposals, Japanese Patent Laid-Open Publication No. 61(1986)-235413 discloses a phenolic resin having excellent thermal resistance, obtained by selecting reactants of a phenol-modified aromatic hydrocarbon resin. However, the phenolic resin obtained by this method is disadvantageously not cured unless being maintained at a high temperature for a prolonged period of time in the manufacturing of a molding by the use thereof.

Japanese Patent Laid-Open Publication No. 2(1990)-274714 discloses that a modified phenolic resin useful for a molding material, having excellent thermal and oxidation resistance and mechanical strength as cannot be expected from the conventional phenolic resin, is obtained by employing a petroleum heavy oil or pitch, which is a cheap material, as a modifier material and by selecting specific reaction conditions.

Further, Japanese Patent Laid-Open Publication No. 4(1992)-145116 discloses that, in the production of such a phenolic resin, a crude modified phenolic resin obtained by a polycondensation of starting compounds is subjected to a neutralization treatment, a water washing treatment and/or an extraction treatment to thereby neutralize and remove any acid remaining in the crude modified phenolic resin, so that a modified phenolic resin which does not corrode a metal member brought into contact with the resin is provided.

In the above process for producing the modified phenolic resin, the acid remaining in the crude modified phenolic resin is actually neutralized and removed by the neutralization treatment using an amine, followed by the water washing treatment. However, the modified phenolic resin obtained through the purification step comprising the above neutralization and water washing treatments is likely to retain a neutralization product therein, so that there is a problem that it is unsatisfactory as a molding material used for a product on which strict requirements for thermal and corrosion resistance are imposed, such as a molding material for electrical or electronic part and a material for semiconductor sealer.

Japanese Patent Application No. 5(1993)-40646 teaches that a modified phenolic resin containing substantially no acid can be obtained by purifying a crude modified phenolic resin through a purification step including a specific extraction treatment. The modified phenolic resin containing substantially no acid, obtained through this purification step, may be combined with an epoxy resin, so that a molding material can be obtained which not only has excellent thermal and moisture resistance but also does not corrode any metals.

However, the above modified phenolic resin has a drawback in that the melt viscosity of the resin is so high that the resin is not suitable for speedy mass production of a molded article having a complex configuration. In addition, further improvements of thermal resistance, dimensional stability and strength and other mechanical properties have been demanded in the use of the modified phenolic resin in combination with an epoxy resin.

The inventors have made extensive and intensive studies with respect to the above drawbacks of the prior art. As a result, it has been found that a novel modified phenolic resin having a low resin melt viscosity and markedly improved in the reactivity with an epoxy resin can be provided by reacting the modified phenolic resin with a phenol in the presence of an acid catalyst to thereby lower the molecular weight of the modified phenolic resin.

Moreover, the inventors have found that a modified phenolic resin having a low resin melt viscosity, exhibiting high reactivity with an epoxy resin and containing substantially no acid can be provided by purifying the modified phenolic resin with an extraction solvent and/or water washing to thereby remove the acid catalyst, etc. contained in the modified phenolic resin. The present invention has been completed based on these findings.

OBJECT OF THE INVENTION

The present invention has been made with a view toward overcoming the above drawbacks of the prior art. An object of the present invention is to provide a process for producing a highly reactive modified phenolic resin, which is suitable for producing a modified phenolic resin having a low resin melt viscosity and markedly improved in the reactivity with an epoxy resin.

Another object of the present invention is to provide a process for producing a highly reactive modified phenolic resin, which is suitable for producing a modified phenolic resin containing substantially no acid, so that it does not exhibit no corrosive action, in addition to having the above low resin melt viscosity and marked improvement in the reactivity with an epoxy resin.

It is a further object of the present invention to provide a molding material comprising the highly reactive modified phenolic resin obtained by the process of the present invention and an epoxy resin, with which a molded article being excellent in not only thermal resistance and moldability but also dimensional stability and mechanical strength, especially a material for electrical or electronic part, or a semiconductor sealer can be produced.

SUMMARY OF THE INVENTION

The process for producing a highly reactive modified phenolic resin according to the present invention comprises the steps of polycondensing a petroleum heavy oil or pitch, a formaldehyde polymer and a phenol in the presence of an acid catalyst to thereby prepare a modified phenolic resin; and reacting the resultant modified phenolic resin with a phenol in the presence of an acid catalyst but substantially in the absence of a formaldehyde polymer as a crosslinking agent to thereby lower the molecular weight of the modified phenolic resin. In the process for producing a highly reactive modified phenolic resin according to the present invention, it is preferred that, in the polycondensation step, a mixture containing the petroleum heavy oil or pitch and the formaldehyde polymer in a ratio of the number of moles, in terms of formaldehyde, of the formaldehyde polymer to that of the petroleum heavy oil or pitch of 1:1 to 15:1 be heated under agitation in the presence of an acid catalyst, and that the phenol be gradually added to the mixture while being heated under agitation until a ratio of the number of moles of the phenol to that of the petroleum heavy oil or pitch of 0.5:1 to 5:1 to thereby effect the polycondensation of the petroleum heavy oil or pitch, the formaldehyde polymer and the phenol.

In the present invention, the modified phenolic resin prepared in the polycondensation step may be treated with a solvent containing at least one compound selected from the group consisting of aliphatic and alicyclic hydrocarbons each having up to 10 carbon atoms (i) and/or an extraction solvent capable of dissolving most of the modified phenolic resin but dissolving the acid catalyst employed in the polycondensation in a solubility of 0.1 or less (ii) to thereby extract and remove solvent-soluble components containing unreacted components and/or catalyst residue, so that the modified phenolic resin is purified, prior to subjecting the modified phenolic resin to the molecular weight lowering step. Thus, it is effectively avoided to take with the acid catalyst residue and/or formaldehyde polymer as unreacted material used in the polycondensation step into the molecular weight lowering step.

The molding material based on the highly reactive modified phenolic resin according to the present invention comprises the highly reactive modified phenolic resin (A) obtained by the above process and an epoxy resin (B). This molding material based on the highly reactive modified phenolic resin may comprise an inorganic filler (D), besides the above resin components (A) and (B).

In the molding material based on modified phenolic resin according to the present invention, it is preferred that the highly reactive modified phenolic resin (A) and the epoxy resin (B) be contained in a weight ratio of 10/90 to 90/10.

The material for electrical or electronic part according to the present invention is characterized in that it is produced by molding the above molding material based on the highly reactive modified phenolic resin.

The semiconductor sealer according to the present invention comprises the above molding material based on the highly reactive modified phenolic resin.

DETAILED DESCRIPTION OF THE INVENTION

Hereinbelow, the present invention will be described in greater detail.

In the process for producing a highly reactive modified phenolic resin according to the present invention, a modified phenolic resin obtained by the specified polycondensation step is subjected to a molecular weight lowering step under the specified conditions to thereby lower the molecular weight thereof, so that the desired highly reactive modified phenolic resin is produced.

In the polycondensation step of the process of the present invention, specifically, a petroleum heavy oil or pitch, a formaldehyde polymer and a phenol are polycondensed in the presence of an acid catalyst.

The petroleum heavy oil or pitch used as a raw material in the above polycondensation reaction includes a distillation residue of crude oil, a hydrocracking residue, a catalytic cracking residue, a thermal cracking residue of naphtha or LPG, and a vacuum distillate, an extract by solvent extraction and a thermal treatment product from such residues. It is preferred that a petroleum heavy oil or pitch having appropriate fa and Ha values be selected from these and used.

For example, it is preferred that the petroleum heavy oil or pitch have a ratio of aromatic hydrocarbon (fa) ranging from 0.40 to 0.95, especially from 0.5 to 0.8, still especially from 0.55 to 0.75 and have a ratio of hydrogen of aromatic ring (Ha) ranging from 20 to 80%, especially from 25 to 60% still especially from 25 to 50%.

The ratio of aromatic hydrocarbon (fa) and the ratio of hydrogen of aromatic ring (Ha) are calculated by the following formulae from the data obtained by $^{13}$C-NMR and $^{1}$H-NMR measurements of the petroleum heavy oil or pitch.

$$fa \text{ value} = \frac{\text{number of aromatic carbon atoms in oil or pitch}}{\text{number of all carbon atoms in oil or pitch}}$$

$$Ha \text{ value} = \frac{\text{number of hydrogen atoms of aromatic rings in oil or pitch}}{\text{number of all hydrogen atoms in oil or pitch}} \times 100 \, (\%)$$

When the fa value of the petroleum heavy oil or pitch as a raw material is smaller than 0.4, the aromatic content is low, so that it is likely that the effect thereof on the improvement of the performance, such as thermal and oxidation resistance, of the resultant modified phenolic resin is less.

On the other hand, when the petroleum heavy oil or pitch has an fa value of greater than 0.95, the reactivity of hydrogen atoms of aromatic rings with formaldehyde is likely to become unfavorably low.

When the Ha value of the petroleum heavy oil or pitch as a raw material is smaller than 20% the amount of aromatic ring hydrogen atoms reacting with formaldehyde is less to thereby cause the reactivity lowering, so that the effect thereof on the improvement of the performance of the phenolic resin is likely to become poor.

On the other hand, when a petroleum heavy oil or pitch having an Ha value of greater than 80% is used as a raw material, the strength of the modified phenolic resin is likely to become poor.

With respect to the aromatic hydrocarbon composing the petroleum heavy oil or pitch used in the present invention, the number of condensed rings is not particularly limited. However, it is generally preferred that the petroleum heavy oil or pitch be mainly composed of polycyclic aromatic hydrocarbons each having 2 to 4 condensed rings. When the petroleum heavy oil or pitch contains condensed polycyclic aromatic hydrocarbons each having at least 5 condensed rings at a high content, such condensed polycyclic aromatic hydrocarbons have generally high boiling points, e.g., over 450° C., so that boiling point variances become large and the aromatic hydrocarbons composing the petroleum heavy oil or pitch cannot be in the narrow range of the boiling point to thereby cause the quality of the product to be unstable. On the other hand, when the petroleum heavy oil or pitch is mainly composed of monocyclic aromatic hydrocarbons, the reactivity with formaldehyde is so low that the effect thereof on the improvement of the quality of the resultant phenolic resin is likely to become poor.

The formaldehyde polymer used as a raw material in combination with the petroleum heavy oil or pitch in the present invention acts as a crosslinking agent, which includes, for example, linear polymers, such as paraformaldehyde and polyoxymethylene (especially, oligomer), and cyclic polymers, such as trioxane.

In the polycondensation step of the process of the present invention, the petroleum heavy oil or pitch is mixed with the formaldehyde polymer in a ratio of the number of moles, in terms of formaldehyde, of the formaldehyde polymer to the number of moles, calculated from the average molecular weight thereof, of the petroleum heavy oil or pitch of generally from 1 to 15, preferably from 2 to 12, and still preferably from 3 to 11.

When the above mixing ratio of the formaldehyde polymer to the petroleum heavy oil or pitch is less than 1, the strength of a cured molding from the resultant modified phenolic resin would be unfavorably low. On the other hand, when the above-mentioned mixing ratio is greater than 15, the properties and yields of obtained cured moldings would no longer vary, so that the use of the formaldehyde polymer in the ratio greater than 15 would be useless. The excess use of the formaldehyde polymer has a possibility of hindering the lowering of the molecular weight of the modified phenolic resin in the below described molecular weight lowering step.

Examples of the phenols used as raw materials in the polycondensation step include phenolic compounds, such as phenol, cresol, xylenol, resorcinol, bisphenol A and bisphenol F. These may be used individually or in combination.

The above phenols are added to the raw material mixture until a ratio of the number of moles of the phenol to the number of moles, calculated from the average molecular weight thereof, of the petroleum heavy oil or pitch of generally 0.3 to 5, preferably from 0.5 to 3.

When the above ratio is less than 0.3, the reactivity between the petroleum heavy oil or pitch and the formaldehyde is lower than that between the phenol and the formaldehyde, so that it may occur that a satisfactory crosslinking density cannot be attained to thereby cause the strength of a cured molding to be poor as compared with that of the conventional phenolic resin. In particular, it is likely for the cured molding to exhibit unfavorably low impact resistance and hence brittleness. On the other hand, when the phenols are added in a ratio greater than 5, it is likely that the effect of the modification of the phenolic resin on the quality improvement is decreased.

In the polycondensation step of the process of the present invention, an acid catalyst is used for polycondensation of the petroleum heavy oil or pitch, the formaldehyde polymer and the phenol. BrØnsted or Lewis acids may be used as such an acid catalyst. BrØnsted acid is preferred. Examples of BrØnsted acids include toluenesulfonic acid, xylenesulfonic acid, hydrochloric acid, sulfuric acid and formic acid. Of these, p-toluenesulfonic acid and hydrochloric acid are particularly preferred.

The above acid catalyst is preferably used in an amount of 0.1 to 30% by weight, still preferably 1 to 20% by weight, relative to the weight of the total of the petroleum heavy oil or pitch, the formaldehyde polymer and the phenol.

When the amount of the added acid catalyst is too small, it is likely that the reaction time is unfavorably long, and that a satisfactory reaction cannot be attained unless the reaction temperature is elevated. On the other hand, when the amount of the acid catalyst is greater, the reaction rate is no longer increased in proportion to the amount thereof, so that a disadvantage in view of cost is likely to be incurred.

In the polycondensation step in which the above described raw materials and acid catalyst are employed, for example, it is preferred that the raw materials are polycondensed by gradually adding the phenol, until the above ratio, to a mixture containing in the above ratio the petroleum heavy oil or pitch and the formaldehyde polymer while being heated under agitation in the presence of the acid catalyst.

The phenol is preferably gradually added by dropping or other methods at a rate of 0.05 to 5 wt. %/min, still preferably 0.1 to 2 wt. %/min, relative to the weight of the total of the reaction mixture.

When the addition rate is less than 0.05 wt. %/min, the time required for the addition is too long, thereby increasing cost. On the other hand, when the addition rate exceeds 5 wt. %/min, the added phenol so rapidly reacts with free formaldehyde, that it is difficult to form a homogeneous mixture or condensate.

The reason for this heterogeneity would be that the reactivity of the formaldehyde is much greater with the phenol than with the petroleum heavy oil or pitch, so that, unless the initial concentration of the phenol is kept low, the formaldehyde undergoes a selective reaction with the phenol or a phenol-formaldehyde condensate formed by condensation reaction to thereby become sparingly soluble in the system.

In the polycondensation step of the process of the present invention, the time at which the phenol is added to the mixture of the petroleum heavy oil or pitch and the formaldehyde polymer is not particularly limited. However, it is preferred that the gradual addition of the phenol be initiated in a period of from a time at which the conversion of formaldehyde, estimated from the amount of remaining free formaldehyde, is substantially 0% to a time at which the conversion of formaldehyde is 70% or less, especially 50% or less.

When the conversion of formaldehyde exceeds 70% the amount of formaldehyde capable of reacting with the added phenol is less, so that the performance of the resultant modified phenolic resin is likely to be deteriorated.

With respect to the heating and agitation of the mixture of the petroleum heavy oil or pitch and the formaldehyde polymer in the presence of the acid catalyst, the reaction temperature and time are determined, depending on the raw material formulation, the rate of addition of the phenol and the properties of the resin to be obtained. Naturally, the reaction temperature and the reaction time are mutually affecting factors. The heating under agitation of the above raw material mixture in the presence of the acid catalyst may preferably be conducted at 50° to 160° C., especially 60° to 120° C. for 0.5 to 10 hr, especially 1 to 5 hr.

When the production of the modified phenolic resin of the present invention is conducted by a batch process, the reaction can be performed in one stage, which is advantageous. Further, when the above production is conducted by a continuous process, it is not necessary to use an apparatus having been employed in the production of the conventional modified phenolic resin, in which a plurality of reaction products must continuously be mixed in respective predetermined proportions and thus difficult control is inevitable. Instead, the continuous production can be performed by disposing a complete mixing type reactor vessel in the middle and introducing the phenol to be added thereinto at a predetermined rate. This allows an apparatus cost to be relatively low, and ensures good operability.

In the present invention, the polycondensation reaction of the petroleum heavy oil or pitch, the formaldehyde polymer and the phenol can be performed in the absence of a solvent. However, an appropriate solvent may be used to lower the viscosity of the reaction mixture (reaction system) so that uniform reaction is ensured.

Examples of such solvents include aromatic hydrocarbons, such as benzene, toluene and xylene; halogenated aromatic hydrocarbons, such as chlorobenzene; nitro-substituted aromatic hydrocarbons, such as nitrobenzene; nitro-substituted aliphatic hydrocarbons, such as nitroethane and nitropropane; and halogenated aliphatic hydrocarbons, such as perchloroethylene, trichloroethylene and carbon tetrachloride.

In the process for producing the highly reactive modified phenolic resin according to the present invention, the modified phenolic resin obtained by the above polycondensation reaction is used to the following molecular weight lowering step. In the molecular weight lowering step, the modified phenolic resin reacts with the phenol in the presence of an acid catalyst but in the absence of formaldehyde polymer and other crosslinking agents, so that the modified phenolic resin has a lowered molecular weight. In this molecular weight lowering step, the reaction conditions and the amounts of raw materials and catalyst are controlled so that the modified phenolic resin has a lowered molecular weight by the reaction thereof with the phenol.

Besides the modified phenolic resin, the acid catalyst, unreacted materials, low molecular weight components, solvent, etc. may remain in the reaction mixture obtained by the above polycondensation reaction, which affect the reaction conditions during the molecular weight lowering step and the amounts of raw materials and catalyst involved in the reaction. For example, when the modified phenolic resin for use in the molecular weight lowering step contains the acid catalyst, the amount of acid catalyst to be added in the above step is affected. Further, especially when the modified phenolic resin contains a large amount of formaldehyde polymer being a crosslinking agent as an unreacted component, the polycondensation of the modified phenolic resin, the formaldehyde polymer and the phenol possibly precedes to thereby hinder the lowering of the molecular weight of the modified phenolic resin.

Therefore, it is preferred that the modified phenolic resin for use in the molecular weight lowering step do not contain the acid catalyst, unreacted materials or the reaction solvent in an amount such that the molecular weight lowering reaction is hindered, especially do not contain the acid catalyst and formaldehyde polymer, from the viewpoint that the reaction conditions during the molecular weight lowering step are appropriately set so as to accomplish effective lowering of the molecular weight of the modified phenolic resin through the reaction thereof with the phenol.

The above modified phenolic resin may be prepared by appropriately controlling the amounts of raw materials, acid catalyst and reaction solvent employed in the polycondensation reaction or the polycondensation reaction conditions to thereby prevent excess unreacted components, acid catalyst and reaction solvent from remaining in the reaction mixture, or alternatively by appropriately purifying the reaction mixture obtained in the polycondensation reaction to thereby remove any unreacted components, low molecular weight components, acid catalyst and reaction solvent.

The method for purifying the reaction mixture, i.e., the crude modified phenolic resin containing the acid catalyst, unreacted components and reaction solvent includes, for example, purification treatment (i) in which the reaction mixture is treated to effect precipitation with a specific solvent to thereby remove solvent-soluble components containing unreacted components, and purification treatment (ii) in which the reaction mixture is dissolved in a specific solvent to thereby extract and remove any catalyst residue.

In the above purification treatment (i), components contained in the petroleum heavy oil or pitch as a raw material, which have low reactivity so as to remain in the reaction mixture in the unreacted or incompletely reacted state and the solvent optionally used in the polycondensation reaction, are removed.

This purification treatment (i) may be accomplished by putting the reaction mixture obtained in the polycondensation step, at any time after the production thereof, in a solvent comprising at least one compound selected from the group consisting of aliphatic and alicyclic hydrocarbons each having up to 10 carbon atoms to thereby precipitate the principal component of the resin and remove components soluble in the solvent, i.e., those unreacted and remaining due to incomplete reaction and the solvent used in the polycondensation reaction.

Aliphatic and alicyclic hydrocarbons, such as pentane, hexane, heptane and cyclohexane, are used as such a hydrocarbon solvent for purification. n-Hexane is particularly preferred.

In the above purification treatment (ii), the acid catalyst and the formaldehyde polymer as a crosslinking agent remaining in the reaction mixture is removed, thereby producing a modified phenolic resin containing substantially no acid. When the catalyst residue remains in the modified phenolic resin, the amount of acid catalyst added in the molecular weight lowering step must be determined taking the above acid catalyst residue into account, so that the control of reaction conditions becomes difficult.

The above purification treatment (ii) may be accomplished by treating the reaction mixture with an extraction solvent capable of dissolving most of the modified phenolic resin but dissolving the acid catalyst used in the polycondensation of the raw materials in a solubility of 0.1 or less to thereby extract and remove catalyst residue and the formaldehyde polymer.

The extraction solvent is not particularly limited as long as it has the above properties, which may, however, preferably be selected from among aromatic hydrocarbons, such as benzene, toluene and xylene. Of these, toluene is particularly preferred.

In the purification treatment (ii) of the present invention, temperature and other conditions are not particularly limited as long as the above performance of the extraction solvent is fully exhibited. The reaction mixture may be put in the extraction solvent, or alternatively the solvent may be added to the reaction mixture. Thus, the purification treatment (ii) can be accomplished readily and simply.

The modified phenolic resin containing substantially no acid, obtained by the above purification treatment (ii), is generally in the form of a varnish having the resin dissolved in a solvent. The modified phenolic resin in the form of a varnish, if it is a final purified product, may be used as it is for the next step of lowering molecular weight. Alternatively, it may be put in a solvent in which the modified phenolic resin is insoluble, such as n-hexane, to effect precipitation to thereby obtain powder of the modified phenolic resin prior to utilization.

Most of the catalyst residue and the formaldehyde polymer remaining in the reaction mixture is removed by the purification treatment (ii). If desired, however, the modified phenolic resin obtained by the purification treatment (ii) may be subjected to a neutralization treatment and/or a water washing treatment to thereby effect further removal of the catalyst residue and the formaldehyde polymer, such as an acid, in the resin.

The neutralization treatment may be performed by adding a basic substance to the modified phenolic resin obtained by the purification treatment (ii). Examples of such basic substances include alkali metal and alkaline earth metal hydroxides, such as sodium, potassium, calcium and magnesium hydroxides, ammonia, diethylenetriamine, triethylenetetramine, aniline and phenylenediamine.

In the purification step employable for the process of the present invention, the purification treatments (i) and (ii) may be carried out in arbitrary sequence. However, because the modified phenolic resin obtained by the purification step (ii) is in the form of a varnish, it is preferred that the varnish be put in a solvent in which the modified phenolic resin is insoluble, for example, n-hexane to thereby recrystallize and harvest powdery modified phenolic resin, from the viewpoint of handling thereof in the molecular weight lowering step.

The case in which the purification treatment (ii) is carried out after the purification treatment (i) is preferred in the viewpoint of the production cost, because the varnish modified phenol resin is used as it is in the next molecular weight lowering step.

In the process for producing a highly reactive modified phenolic resin according to the present invention, the above modified phenolic resin, i.e., the reaction product obtained in the polycondensation step, is reacted as it is or after having been purified with a phenol in the presence of an acid catalyst but in the absence of formaldehyde polymer and other crosslinking agents, so that the modified phenolic resin has a lowered molecular weight.

In the above molecular weight lowering reaction, it is believed that the acetal and/or methylene ether bond present in the molecule of the modified phenolic resin is broken and dissociated to thereby lower the molecular weight of the modified phenolic resin, and that the phenol is bonded to a terminal resulting from the dissociation to thereby increase the phenol content of the modified phenolic resin, so that a highly reactive modified phenolic resin having a low resin melt viscosity and being excellent in the reactivity with an epoxy resin can be obtained.

The amounts, types and combinations of raw materials and acid catalyst employed in the molecular weight lowering step and the reaction conditions such as reaction temperature, are not particularly limited as long as the desired lowering of the molecular weight of the modified phenolic resin and desired improvement in the reactivity with an epoxy resin can be realized.

Therefore, for example, the phenols and acid catalysts mentioned hereinbefore as being suitable for use in the polycondensation step may also be suitably employed in the molecular weight lowering step.

In the molecular weight lowering step of the process of the present invention, the phenol is employed in an amount of generally at least 0.1 part by weight, preferably at least 10 parts by weight, more preferably from 15 to 250 parts by weight, still preferably from 20 to 200 parts by weight, especially 20–100 parts by weight, per 100 parts by weight of the modified phenolic resin. When the amount of the phenol is at least 0.1 part by weight, the molecular weight lowering reaction is advanced to an extent sufficient for obtaining the desired effect. However, the use of the phenol in excess would result in the remaining of a large amount of unreacted phenol, thereby increasing the cost for posttreatment.

The acid catalyst is added preferably in an amount of 0.1 to 15 parts by weight, still preferably from 0.2 to 10 parts by weight per 100 parts by weight of the crude modified phenolic resin.

In the molecular weight lowering step, the reaction may be carried out in the absence or presence of a reaction solvent. The reaction solvent is not particularly limited as long as it does not hinder the above molecular weight lowering reaction. For example, the solvents employed in the polycondensation reaction and ketones such as tetrahydrofuran, methyl ethyl ketone, methyl isobutyl ketone and acetone may be used in the molecular weight lowering step. The above solvent is used preferably in an amount of 0 to 300 parts by weight, per 100 parts by weight of the modified phenolic resin.

Although the reaction temperature is not particularly limited, it is generally in the range of from 50° to 120° C., preferably from 80° to 120° C. Also, although the reaction time is not particularly limited, it is generally in the range of from 15 min to 2.0 hr, preferably from 30 rain to 2.0 hr.

The modified phenolic resin having undergone the above molecular weight lowering step has a lowered number average molecular weight (a), an improved reactivity with an epoxy resin (judged on the basis of gelation time; shorter gelation time means higher reactivity) (b), and a lowered resin melt viscosity (c), as compared with those of the modified phenolic resin obtained by the polycondensation step.

The thus obtained highly reactive modified phenolic resin has such a range of number average molecular weight from 300 to 800, and has such a low resin melt viscosity that its moldability is excellent, and has such a high reactivity with an epoxy resin that its combination with an epoxy resin provides a molding material based on modified phenolic resin which is excellent in dimensional stability, strength and other mechanical properties.

Although the highly reactive modified phenolic resin having undergone the molecular weight lowering reaction as it is may be employed in various application fields, it is preferred that the modified phenolic resin be purified before use in the same manner as in the purification treatments (i) and (ii) with using the same solvents as therein or in a purification treatment using other solvent to thereby remove acid catalyst, unreacted materials, reaction solvent, etc. remaining in the resin. In the solvent used for the purification of the highly reactive modified phenol resin, preferred are toluene; mixed solvents of toluene with alcohols such as methyl alcohol and ethyl alcohol; mixed solvents of toluene with ketones such as acetone, tetrahydrofurane, methyl ethyl ketone and methyl isobutyl ketone.

It is preferred that the highly reactive modified phenol resin is subjected to a washing treatment using distilled water or a mixture thereof with isopropyl alcohol after extracting the unreacted component such as phenols and the acid catalyst with the solvents as described above.

It is also preferred that the highly reactive modified phenol resin is desolvated or precipitated with an aliphatic or alicyclic hydrocarbon having not more than 10 carbon atoms, or the mixture thereof, after having been removed with unreacted component and the acid catalyst. The hydrocarbon solvent includes those described in the purification treatment (i). Among them, n-hexane is especially preferred.

The purification as described above removes the acid catalyst, unreacted materials and reaction solvent remaining in the resin to thereby provide a highly reactive modified phenolic resin which contains substantially no acid, thereby exhibiting no corrosive action to metals and from which low molecular weight components have been removed, thereby having improved thermal resistance and dimensional stability. The terminology "containing substantially no acid" used herein means that either an acid or the like is completely absent, or an extremely small amount thereof remains which however does not exhibit any significant corrosive action to metals.

The molding material based on modified phenolic resin according to the present invention comprises an epoxy resin (B) together with the highly reactive modified phenolic resin (A) obtained by the process of the present invention. The epoxy resin generally exhibits less molding shrinkage, excellent thermal, abrasion and chemical resistance, and high electrical insulating property. The epoxy resin may optionally be employed in combination with a curing agent and/or curing accelerator (C).

Various epoxy resins are available, which include, for example, glycidyl ether, glycidyl ester, glycidylamine, mixed and alicyclic epoxy resins.

In particular, examples of the glycidyl ether (based on phenol) epoxy resins include bisphenol A, biphenyl, bisphenol F, tetrabromobisphenol A, tetraphenylolethane, phenolic novolak and o-cresol novolak epoxy resins.

Examples of the glycidyl ether (based on alcohol) epoxy resins include polypropylene glycol and hydrogenated bisphenol A epoxy resins.

Examples of the glycidyl ester epoxy resins include hexahydrophthalic anhydride and dimer acid epoxy resins.

Examples of the glycidylamine epoxy resins include diaminodiphenylmethane, isocyanuric acid and hydantoinic acid epoxy resins.

Examples of the mixed epoxy resins include p-aminophenol and p-oxybenzoic acid epoxy resins.

Of the above epoxy resins, bisphenol A, biphenyl, glycidylamine and phenolic novolak epoxy resins are preferred. The above epoxy resins may also be used in combination.

The ratio at which the highly reactive modified phenolic resin of the present invention is blended with the epoxy resin is not particularly limited. However, it is generally preferred that the modified phenolic resin be blended with the epoxy resin at a ratio of 10/90 to 90/10 (parts by weight), especially 20/80 to 80/20 (parts by weight).

When the above ratio is lower than 10/90 by weight, the effect on the improvement of the thermal and moisture resistance of the obtained molding is not satisfactory. When the above ratio is higher than 90/10 by weight, the molding temperature is likely to be unfavorably high.

Various conventional curing agents and accelerators used for curing epoxy resins can be employed as a curing agent and/or accelerator (C) to be incorporated in the molding material based on modified phenolic resin according to the present invention. Examples of such curing agents include cyclic amines, aliphatic amines, polyamides, aromatic polyamines and acid anhydrides.

In particular, examples of suitable cyclic amines include hexamethylenetetramine, and examples of suitable aliphatic amines include diethylenetriamine, triethylenetetramine, tetraethylenepentamine, diethylaminopropylamine, N-aminoethylpiperamine, isophoronediamine, bis(4-amino-3-methylcyclohexyl)methane and menthanediamine.

Examples of the polyamides include condensates of a fatty acid from vegetable oil (dimer or trimer acid) and an aliphatic polyamine.

Examples of the aromatic polyamines include m-phenylenediamine, 4,4'-diaminodiphenylmethane, 4,4'-diaminodiphenyl sulfone and m-xylylenediamine.

Examples of the acid anhydrides include phthalic anhydride, tetrahydrophthalic anhydride, hexahydrophthalic anhydride, trimellitic anhydride, pyromellitic anhydride, benzophenonetetracarboxylic anhydride, chlorendic anhydride, dodecenylsuccinic anhydride, methyltetrahydrophthalic anhydride and methylendomethylenetetrahydrophthalic anhydride.

Examples of the curing accelerators include diazabicycloalkenes such as 1,8-diazabicyclo(5,4,0)undecene-7 and derivatives thereof; tertiary amines such as triethylenediamine, benzyldimethylamine, triethanolamine, dimethylaminoethanol and tris(dimethylaminomethyl)phenol; imidazoles such as 2-methylimidazole, 2-ethyl-4-methylimidazole, 2-phenylimidazole, 2-phenyl-4-methylimidazole and 2-heptadecylimidazole; organophosphines such as tributylphosphine, methyldiphenylphosphine and triphenylphosphine; tetrasubstituted-phosphonium tetra-substituted-borates such as tetraphenylphosphonium tetraphenylborate; tetraphenylborates such as 2-ethyl-4-methylimidazolyl tetraphenylborate and N-methylmorpholinyl tetraphenylborate; Lewis acids such as boron trifluoride/amine complex; Lewis bases such as dicyanodiamide and adipodihydrazide; and polymercaptans and polysulfides. The above curing agents and curing accelerators may be employed either individually or in combination.

The molding material based on modified phenolic resin according to the present invention may comprise an inorganic filler (D), in addition to the highly reactive modified phenolic resin (A), the epoxy resin (B) and the optionally added curing agent and/or curing accelerator (C).

The strength and dimensional stability of the obtained molding can further be improved by the addition of the inorganic filler (D) to the molding material.

Various conventional inorganic fillers having been used as an inorganic filler or reinforcement for plastic materials may be used as the inorganic filler (D) in the present invention. Examples of such inorganic fillers include reinforcing fibers, such as glass, carbon, phosphor and boron fibers; hydrated metal oxides, such as aluminum and magnesium hydroxides; metal carbonates, such as magnesium and calcium carbonates; metal borates, such as magnesium borate; and inorganic reinforcements, such as silica, mica and fused silica.

The amount of added inorganic filler (D) is not particularly limited. However, it is preferred that 20 to 800 parts by weight, especially 50 to 600 parts by weight of the inorganic filler be added per 100 parts by weight of the highly reactive modified phenolic resin.

Moreover, if desired, the molding material based on modified phenolic resin according to the present invention may further comprise additives, including internal release agents, such as silicone and waxes, coupling agents, flame retarders, light stabilizers, antioxidants, pigments and extenders.

The molding material based on modified phenolic resin according to the present invention as described above is prepared by mixing together the highly reactive modified phenolic resin (A) and the epoxy resin (B), optionally together with the curing agent and/or curing accelerator (C), the inorganic filler (D) and various additives, and used for forming various moldings.

In the present invention, the sequence in which the highly reactive modified phenolic resin (A), the epoxy resin (B) and optionally added components such as the curing agent (C) are blended, is not particularly limited. For example, a powdery molding compound may be obtained by first blending a highly reactive modified phenolic resin with an epoxy resin, secondly adding a curing agent (curing accelerator) to the blend, followed by effective kneading, and finally, if desired, adding an inorganic filler and additives, followed by kneading.

In particular, the above compound may be produced by the following sequence of operations:

(1) blending a highly reactive modified phenolic resin with an epoxy resin in an automatic mortar at room temperature;

(2) adding to the resultant blend other additives such as a curing agent and wax, followed by blending;

(3) adding to the resultant blend an inorganic filler, followed by blending; and (4) further effecting blending by means of rolls heated at 80° to 90° C. for 3 to 10 min, cooling to room temperature and pulverizing to thereby obtain the desired compound.

In this sequence of operations, the additions of the inorganic filler and the other additives are separately carried out after the blending of the highly reactive modified phenolic resin and the epoxy resin. This is not critical, and the additions of the additives may be conducted at an arbitrary time.

The molding material based on the highly reactive modified phenolic resin according to the present invention can be molded by various conventional molding means, including, for example, compression, injection, extrusion, transfer and casting molding techniques.

In particular, when the molding material based on modified phenolic resin according to the present invention is formed into a molding by transfer molding technique, such molding conditions are preferably selected that the molding temperature is in the range of from 120° to 200° C., the injection pressure is in the range of from 5 to 300 Kgf/cm$^2$, especially 20 to 300 Kgf/cm$^2$, the clamp pressure is in the range of from 50 to 250 Kgf/cm$^2$ and the molding time is in the range of from 1 to 10 min. The resultant molding is preferably subjected to a postcure comprising heating at 150° to 300° C. for 0.5 to 24 hr.

The postcure further improves the thermal resistance of the molding.

The molding obtained from the molding material based on modified phenolic resin according to the present invention has, for example, the following properties:

| Flexural strength | room temperature | 8–22 kgf/mm$^2$ |
| --- | --- | --- |
| | 150° C. | 3–14 kgf/mm$^2$ |
| Flexural modulus | room temperature | 400–1800 kgf/mm$^2$ |
| | 150° C. | 40–1500 kgf/mm$^2$ |
| Glass transition temperature (°C.) | | 120–260° C. |
| Thermal deformation temperature | | 190–300° C. or higher |
| Water absorption | ordinary state | 0.08–0.13 wt. % |
| | after boiling | 0.12–0.17 wt. % |
| Insulation resistance | ordinary state | $1.8 \times 10^{14}$–$5.0 \times 10^{14}$ Ω |
| | after boiling | $3.0 \times 10^{13}$–$2.0 \times 10^{14}$ Ω |

The modified phenolic resin has an improved reactivity with the epoxy resin in the molding material based on modified phenolic resin according to the present invention, so that the resultant molding exhibits improved mechanical properties, e.g., dimensional stability, and thermal stability. In the molding material based on modified phenolic resin according to the present invention, the use of the modified phenolic resin containing substantially no acid reduces the corrosive action to metals, and the addition of an inorganic filler further improves the mechanical strength and electrical insulating property of the molding.

Therefore, the molding material based on the highly reactive modified phenolic resin according to the present invention can suitably be employed to provide a material for electrical or electronic parts, such as a printed board, an insulation and a sealant, on which very strict requirements are imposed regarding the dimensional stability, thermal resistance and moldability. Moreover, the molding material of the present invention is suitable for use as a semiconductor sealer on which improvements of thermal resistance, dimensional stability for coping with stress damaging attributed to integration increase, and moisture absorption are demanded.

EFFECT OF THE INVENTION

The process for producing a highly reactive modified phenolic resin according to the present invention provides a highly reactive modified phenolic resin having a low resin melt viscosity and a markedly improved reactivity with an epoxy resin by virtue of the above polycondensation step followed by the molecular weight lowering step.

Further, in the process for producing a highly reactive modified phenolic resin according to the present invention, the purification of the highly reactive modified phenolic resin obtained in the above molecular weight lowering step to remove the unreacted components and the acid catalyst provides a highly reactive modified phenolic resin which substantially does not contain an acid, thereby exhibiting no significant corrosive action, besides the above low resin melt viscosity and markedly improved reactivity with an epoxy resin.

Still further, the molding material based on modified phenolic resin according to the present invention comprises the highly reactive modified phenolic resin obtained by the process of the present invention and an epoxy resin, and can be formed into a molding which is excellent in not only thermal resistance and moldability but also dimensional stability and other mechanical properties. In particular, the molding material based on modified phenolic resin provides a material for electrical or electronic part and a semiconductor sealer.

EXAMPLE

The present invention will further be illustrated with reference to the following Examples, which should not be construed as limiting the scope of the invention.

In the following Examples, the parts are by weight, unless otherwise specified. The characteristics of stock oil as a raw material for polycondensation are indicated in Table 1. The stock oil is one obtained by distilling bottom oil produced by fluid catalytic cracking (FCC) of vacuum gas oil.

TABLE 1

| | |
|---|---|
| Average Molecular Weight | 271 |
| Boiling Point (°C.) | 241.5–466.5 |
| Ratio of Aromatic Hydrocarbon (fa) | 0.65 |
| Ratio of Hydrogen of Aromatic Ring (Ha) (%) | 28 |

Note:
(1) Average molecular weight: value measured according to the vapor pressure osmometry.
(2) Boiling point: value of °C. in terms of the atmospheric pressure, measured according to ASTM D-1160.

In the following Examples, the number average molecular weight, the reactivity with an epoxy resin (judged on the basis of gelation time; shorter gelation time means higher reactivity) and the resin melt viscosity were measured by the following apparatus or standard.

[Number average molecular weight] measured by the use of the vapor pressure osmometry molecular-weight determination apparatus, model 117, manufactured by Corona Electric.

[Viscosity measurement] measured by the ICI cone plate viscometer manufactured by ICI.

[Gelation Time] measured at 170° C. in accordance with Japanese Industrial Standard (JIS) K6910.

Example 1

(Polycondensation Step)

334 g of the stock oil having the characteristics indicated in Table 1, 370 g of paraformaldehyde, 137 g of p-toluenesulfonic acid monohydrate and 678.5 g of p-xylene were charged into a glass reactor, and the temperature thereof was elevated to 95° C. under agitation.

The mixture was heated at 95° C. for 1 hr. Then, 209 g of phenol was dropwise added at a rate of 1.3 g/min. After the completion of the addition of phenol, agitation was continued for 15 min to effect reaction. Thereafter, the reaction mixture was poured into 3300 g of n-hexane to thereby precipitate a reaction product. The precipitate was separated from the unreacted components and solvent by filtration, and washed with 1600 g of n-hexane. The washed precipitate was dried in vacuo to thereby obtain a crude modified phenolic resin containing an acid.

The modified phenolic resin was dissolved in a 10-fold weight of toluene, and insoluble matter mainly composed of p-toluenesulfonic acid monohydrate was filtered off. The thus obtained toluene solution of the modified phenolic resin was concentrated to a resin concentration of 50% by weight, and a small amount of triethylenetetramine was added thereto to effect neutralization. The resultant toluene solution of the resin was put in a 3.3-fold weight of n-hexane to thereby precipitate the resin. The resin was collected by filtration, and dried in vacuo to thereby obtain 580 g of a powder of a modified phenolic resin. (Molecular Weight Lowering Step)

100 g of the thus obtained modified phenolic resin, 88 g of phenol, 1 g of p-toluenesulfonic acid and 100 g of p-xylene were charged into a 1-liter glass reactor. The mixture was heated while stirring at a rate of 250 to 350 rpm so that the temperature thereof rose to 95° C. The mixture was heated at 95° C. for 60 min to thereby obtain a reaction product.

The thus obtained reaction product was put in a 2-fold weight of toluene, and the resultant toluene solution was filtered to thereby remove insoluble matter. Then, the toluene solution of the resin was washed with a liquid mixture of distilled water and isopropanol to thereby extract and remove unreacted phenol and acid remaining in the reaction mixture. Thereafter, toluene was removed by the use of an evaporator, and the residue was dried in vacuo to thereby obtain 130 g of a highly reactive modified phenolic resin.

The number average molecular weight and viscosity at 150° C. of the obtained highly reactive modified phenolic resin were measured, and the results together with the reaction conditions, extraction solvent and yield in the molecular weight lowering step are shown in Table 2.

Examples 2 to 4

A highly reactive modified phenolic resin was prepared in the same manner as in Example 1, except that the reaction conditions of the molecular weight lowering step were changed as specified in Table 2.

The number average molecular weight and viscosity at 150° C. of the obtained highly reactive modified phenolic resin were measured, and the results are shown in Table 2.

Example 5

A highly reactive modified phenolic resin was prepared in the same manner as in Example 1, except that the powder of the modified phenolic resin was changed to the varnish modified phenolic resin (resin concentration: 50%) prepared in Example 1 and the reaction conditions in the molecular weight lowering step were changed as specified in Table 2.

The number average molecular weight and viscosity at 150° C. of the obtained highly reactive modified phenolic resin were measured, and the results are shown in Table 2.

Comparative Example 1

A modified phenolic resin was prepared in the same manner as in Example 1, except that the molecular weight lowering step was not conducted.

The number average molecular weight and viscosity at 150° C. of the obtained modified phenolic resin were measured, and the results are shown in Table 2.

TABLE 2

|  | Ex. 1 | Ex. 2 | Ex. 3 | Ex. 4 | Ex. 5 | Comp. Ex. 1 |
|---|---|---|---|---|---|---|
| Amount of Modified Phenol Resin (g) | | | | | | |
| Powder | 100 | 100 | 100 | 100 | — | — |
| Varnish | — | — | — | — | 200 | — |
| Amount of Phenol (g) | 88 | 88 | 22 | 44 | 200 | — |
| Amount of Acid Catalyst (PTS) (g) | 1.0 | 0.5 | 0.5 | 1.0 | 10 | — |
| Amount of Reaction Solvent (P-Xy) (g) | 100 | 0 | 250 | 100 | 0 | — |
| Reaction Temperature (°C.) | 95 | 95 | 115 | 95 | 115 | — |
| Reaction Time (min) | 90 | 120 | 120 | 30 | 150 | — |
| Extraction Solvent | Toluene | Toluene | Toluene | Toluene | Toluene | — |
| Yield of Reaction Product (g) | 130 | 105 | 95 | 115 | 120 | — |
| Viscosity at 150° C. (ICI Viscometer) (P) | 2.5 | 62.5 | 52.3 | 21.4 | 1.0 | 117 or more |
| Number Average Molecular Weight (VPO) | 417 | 697 | 672 | 581 | 374 | 1317 |

Example 6

A vanish modified phenolic resin (resin concentration: 50%) was obtained by the same polycondensation step as in Example 1.

The thus obtained varnish modified phenolic resin was subjected to the same molecular weight lowering step as in Example 1, except that the reaction conditions were changed as specified in Table 3.

The resultant reaction product was dissolved in a 2-fold weight of a liquid mixture of toluene and methanol, and the resultant resin solution was washed with a liquid mixture of distilled water and isopropanol to thereby extract and remove acid and unreacted phenol. Thereafter, the liquid mixture of toluene and methanol was removed from the resin solution by the use of an evaporator, and the residue was dried in vacuo to thereby obtain a highly reactive modified phenolic resin.

The number average molecular weight and viscosity at 150° C. of the obtained highly reactive modified phenolic resin were measured, and the results are shown in Table 3.

Examples 7 to 10

A highly reactive modified phenolic resin was prepared in the same manner as in Example 6, except that the powder of the modified phenolic resin obtained in Example 1 was used in place of the varnish modified phenolic resin, and that the reaction conditions and extraction solvent of the molecular weight lowering step were changed as specified in Table 3.

The number average molecular weight and viscosity at 150° C. of the obtained highly reactive modified phenolic resin were measured, and the results are shown in Table 3.

TABLE 3

|  | Ex. 6 | Ex. 7 | Ex. 8 | Ex. 9 | Ex. 10 |
|---|---|---|---|---|---|
| Amount of Modified Phenol Resin (g) | | | | | |
| Powder | — | 100 | 100 | 100 | 100 |
| Varnish | 200 | — | — | — | — |
| Amount of Phenol (g) | 44 | 66 | 100 | 100 | 200 |
| Amount of Acid Catalyst (PTS) (g) | 1.0 | 1.0 | 1.5 | 1.5 | 5.0 |
| Amount of Reaction Solvent (g) | | | | | |
| P-xylene | 0 | 20 | 0 | 0 | 0 |
| Toluene | 0 | 0 | 40 | 0 | 0 |
| Tetrahydrofuran | 0 | 0 | 0 | 40 | 0 |
| Reaction Temperature (°C.) | 95 | 95 | 65 | 65 | 65 |
| Reaction Time (min) | 60 | 60 | 60 | 120 | 120 |
| Extraction Solvent | Toluene/ Methanol | Toluene/ Methanol | Toluene/ Methanol | Toluene/ Methanol | Toluene/ Methyl-isobutyl ketone |
| (Mixing Ratio) | (6/4) | (9/1) | (6/4) | (6/4) | (7/3) |
| Yield of Reaction Product (g) | 120 | 130 | 142 | 133 | 185 |
| Viscosity at 150° C. (ICI Viscometer) (P) | 18.0 | 3.7 | 4.4 | 3.8 | 3.3 |
| Number Average Molecular Weight (VPO) | 646 | 562 | 565 | 560 | 500 |

Example 11

40 parts by weight of the highly reactive modified phenolic resin obtained in Example 1 and 60 parts by weight of biphenyl epoxy resin [YX-4000H (trade name), produced by Yuka Shell Epoxy Co., Ltd.] were blended together by the use of an automatic mortar at room temperature. 2.04 parts by weight of 2-ethyl-4-methyl-imidazole (1st grade reagent, produced by Wako Pure Chemical Industries, Ltd.) was added as a curing agent, and blended to thereby obtain a curing-accelerator-containing resin blend.

The gelation time of this curing-accelerator-containing resin blend was measured as shown in Table 5.

Further, 0.82 part by weight of carnauba wax was added to the curing-accelerator-containing resin blend, and blended. Still further, 308.6 parts by weight of fused silica [CRS102-RD8 (trade name), produced by Tatsumori Co., Ltd.] was added as an inorganic filler, and blended. The resultant blend was further blended by means of rolls heated at 80° to 90° C. for 3 to 10 rain and cooled to room temperature to effect curing, followed by pulverization. Thus, a compound (molding material) was obtained. The formulation of this compound is shown in Table 4.

The resultant compound was subjected to transfer molding conducted at 175° C. for 90 sec, and postcured at 175° C. for 6 hr to thereby obtain a molding.

The properties (glass transition temperature and linear expansion coefficient) of the molding were measured, and the results are shown in Table 5.

Examples 12 to 19

Curing-accelerator-containing resin blends, compounds and moldings were produced in the same manner as in Example 11, except that the highly reactive modified phenolic resin obtained in Examples 2–9 were used respectively, instead of that obtained in Example 1.

The gelation times of the curing-accelerator-containing resin blends and the properties (glass transition temperature and linear expansion coefficient) of the moldings were measured, and the results are shown in Table 5.

Example 20

A curing-accelerator-containing resin blend, a compound and a molding were produced in the same manner as in Example 11, except that the highly reactive modified phenolic resin obtained in Example 10 was used instead of the highly reactive modified phenolic resin obtained in Example 1, that triphenylphosphine (produced by Kanto Chemical Co., Ltd.) was used as a curing accelerator, and that the formulation was as specified in Table 4.

The gelation time of the curing-accelerator-containing resin blend and the properties (glass transition temperature and linear expansion coefficient) of the molding were measured, and the results are shown in Table 5.

Comparative Example 2

A curing-accelerator-containing resin blend, a compound and a molding were produced in the same manner as in Example 11, except that the modified phenolic resin obtained in Comparative Example 1 was used instead of the highly reactive modified phenolic resin obtained in Example 1.

The gelation time of the curing-accelerator-containing resin blend and the properties (glass transition temperature and linear expansion coefficient) of the molding were measured, and the results are shown in Table 5.

Examples 21 to 22

Curing-accelerator-containing resin blends, compounds and moldings were produced in the same manner as in Example 11, except that a modified phenolic resin, an epoxy resin, a filler and a curing accelerator were blended together in the formulation specified in Table 4.

The gelation times of the curing-accelerator-containing resin blends and the properties (glass transition temperature and linear expansion coefficient) of the moldings were measured, and the results are shown in Table 5.

Example 23

A curing-accelerator-containing resin blend, a compound and a molding were produced in the same manner as in Example 11, except that the highly reactive modified phenolic resin obtained in Example 7 was used instead of the highly reactive modified phenolic resin obtained in Example 1, and that a modified phenolic resin, an epoxy resin, a filler and a curing accelerator were blended together in the formulation specified in Table 4.

The gelation time of the curing-accelerator-containing resin blend and the properties (glass transition temperature and linear expansion coefficient) of the molding were measured, and the results are shown in Table 5.

Example 24

A molding was produced in the same manner as in Example 11, except that the compound produced in the same manner as in Example 23 was used, and that the conditions specified in Table 5 were employed.

The gelation time of the curing-accelerator-containing resin blend and the properties (glass transition temperature and linear expansion coefficient) of the molding were measured, and the results are shown in Table 5.

Comparative Example 3

A curing-accelerator-containing resin blend, a compound and a molding were produced in the same manner as in Example 24, except that the modified phenolic resin obtained in Comparative Example 1 was used instead of the highly reactive modified phenolic resin obtained in Example 1.

The gelation time of the curing-accelerator-containing resin blend and the properties (glass transition temperature and linear expansion coefficient) of the molding were measured, and the results are shown in Table 5.

Examples 25 to 28

Curing-accelerator-containing resin blends, compounds and moldings were produced in the same manner as in Example 11, except that the highly reactive modified phenolic resins obtained in Examples 7 to 9 were used instead of the highly reactive modified phenolic resin obtained in Example 1, that o-cresol novolak epoxy resin [EOCN4400H (trade name) produced by Nippon Kayaku Kabushiki Kaisha] was used as an epoxy resin, and that the formulations were as specified in Table 4.

The gelation times of the curing-accelerator-containing resin blends and the properties (glass transition temperature and linear expansion coefficient) of the moldings were measured, and the results are shown in Table 5.

Example 29

A curing-accelerator-containing resin blend, a compound and a molding were produced in the same manner as in Example 25, except that the highly reactive modified phenolic resin obtained in Example 10 was used instead of the highly reactive modified phenolic resin obtained in Example 7, that triphenylphosphine (produced by Kanto Chemical Co., Ltd.) was used as a curing accelerator, and that the formulation was as specified in Table 4.

The gelation times of the curing-accelerator-containing resin blends and the properties (glass transition temperature and linear expansion coefficient) of the moldings were measured, and the results are shown in Table 5.

Comparative Example 4

A curing-accelerator-containing resin blend, a compound and a molding were produced in the same manner as in Example 25, except that the modified phenolic resin obtained in Comparative Example 1 was used instead of the highly reactive modified phenolic resin obtained in Example 7.

The gelation time of the curing-accelerator-containing resin blend and the properties (glass transition temperature and linear expansion coefficient) of the molding were measured, and the results are shown in Table 5.

Example 30

A molding was produced in the same manner as in Example 11, except that the compound produced in the same manner as in Example 25 was used, and that the conditions specified in Table 5 were employed.

The gelation time of the curing-accelerator-containing resin blend and the properties (glass transition temperature and linear expansion coefficient) of the molding were measured, and the results are shown in Table 5.

Example 31

A molding was produced in the same manner as in Example 11, except that the compound produced in the same manner as in Example 26 was used, and that the conditions specified in Table 5 were employed.

The gelation time of the curing-accelerator-containing resin blend and the properties (glass transition temperature and linear expansion coefficient) of the molding were measured, and the results are shown in Table 5.

Comparative Example 5

A curing-accelerator-containing resin blend and a compound were produced in the same manner as in Example 26, except that the modified phenolic resin obtained in Comparative Example 1 was used instead of the highly reactive modified phenolic resin obtained in Example 7.

A molding was produced in the same manner as in Example 11, except that the above compound was used, and the conditions specified in Table 5 were employed.

The gelation time of the curing-accelerator-containing resin blend and the properties (glass transition temperature and linear expansion coefficient) of the molding were measured, and the results are shown in Table 5.

Example 32

A curing-accelerator-containing resin blend, a compound and a molding were produced in the same manner as in Example 11, except that the highly reactive modified phenolic resin obtained in Example 7 was used instead of the highly reactive modified phenolic resin obtained in Example 1, that Adaldite MY-9512 (trade name for glycidylaminic tetrafunctional epoxy resin, produced by Nippon Ciba Geigy Co., Ltd.) and short fiber ES-30T (trade name, manufactured by Unitika UM Glass Co., Ltd.) were employed as an epoxy resin and a filler, respectively, and that the formulation was as specified in Table 4.

The gelation times of the curing-accelerator-containing resin blends and the properties (glass transition temperature and linear expansion coefficient) of the moldings were measured, and the results are shown in Table 5.

Comparative Example 5

A curing-accelerator-containing resin blend, a compound and a molding were produced in the same manner as in Example 32, except that the modified phenolic resin obtained in Comparative Example 1 was used instead of the highly reactive modified phenolic resin obtained in Example 7.

The gelation time of the curing-accelerator-containing resin blend and the properties (glass transition temperature and linear expansion coefficient) of the molding were measured, and the results are shown in Table 5.

TABLE 4

| Ex. & Comp. Ex. No. | Amount of Resin | | Epoxy Resin | | Filler | | Amount of Curing Accelerator (pts. wt.) | | Amount of Internal Release Agent (pts. wt.) |
|---|---|---|---|---|---|---|---|---|---|
| | Resin | (pts. wt.) | Type*1 | Amount (pts. wt.) | Type*2 | Amount (pts. wt.) | 2E4MZ*3 | TPP*4 | |
| | | | | (I) | | | | | |
| Ex. 11 | Ex. 1 | 40 | YX4000H | 60 | Fused Silica | 308.6 | 2.04 | 0 | 0.82 |
| Ex. 12 | Ex. 2 | 40 | YX4000H | 60 | Fused Silica | 308.6 | 2.04 | 0 | 0.82 |
| Ex. 13 | Ex. 3 | 40 | YX4000H | 60 | Fused Silica | 308.6 | 2.04 | 0 | 0.82 |
| Ex. 14 | Ex. 4 | 40 | YX4000H | 60 | Fused Silica | 308.6 | 2.04 | 0 | 0.82 |

TABLE 4-continued

Formation of Compound

| Ex. & Comp. Ex. No. | Resin | Amount of Resin (pts. wt.) | Epoxy Resin Type*1 | Amount (pts. wt.) | Filler Type*2 | Amount (pts. wt.) | Amount of Curing Accelerator (pts. wt.) 2E4MZ*3 | TPP*4 | Amount of Internal Release Agent (pts. wt.) |
|---|---|---|---|---|---|---|---|---|---|
| Ex. 15 | Ex. 5 | 40 | YX4000H | 60 | Fused Silica | 308.6 | 2.04 | 0 | 0.82 |
| Ex. 16 | Ex. 6 | 40 | YX4000H | 60 | Fused Silica | 308.6 | 2.04 | 0 | 0.82 |
| Ex. 17 | Ex. 7 | 40 | YX4000H | 60 | Fused Silica | 308.6 | 2.04 | 0 | 0.82 |
| Ex. 18 | Ex. 8 | 40 | YX4000H | 60 | Fused Silica | 308.6 | 2.04 | 0 | 0.82 |
| Ex. 19 | Ex. 9 | 40 | YX4000H | 60 | Fused Silica | 308.6 | 2.04 | 0 | 0.82 |
| (II) | | | | | | | | | |
| Ex. 20 | Ex. 10 | 38 | YX4000H | 62 | Fused Silica | 305.5 | 0 | 1.01 | 0.82 |
| Comp. Ex. 2 | Comp. Ex. 1 | 40 | YX4000H | 60 | Fused Silica | 308.6 | 2.04 | 0 | 0.82 |
| Ex. 21 | Ex. 1 | 30 | YX4000H | 70 | Fused Silica | 308.6 | 2.04 | 0 | 0.82 |
| Ex. 22 | Ex. 1 | 30 | YX4000H | 70 | Fused Silica | 306.5 | 2.04 | 0 | 1.03 |
| Ex. 23 | Ex. 7 | 30 | YX4000H | 70 | Fused Silica | 308.6 | 2.04 | 0 | 0.82 |
| Ex. 24 | Ex. 7 | 30 | YX4000H | 70 | Fused Silica | 308.6 | 2.04 | 0 | 0.82 |
| Comp. Ex. 3 | Comp. Ex. 1 | 30 | YX4000H | 70 | Fused Silica | 308.6 | 2.04 | 0 | 0.82 |
| Ex. 25 | Ex. 7 | 30 | EOCN4400H | 70 | Fused Silica | 305.5 | 1.01 | 0 | 0.81 |
| Ex. 26 | Ex. 7 | 40 | EOCN4400H | 60 | Fused Silica | 305.5 | 1.01 | 0 | 0.81 |
| (III) | | | | | | | | | |
| Ex. 27 | Ex. 8 | 40 | EOCN4400H | 60 | Fused Silica | 305.5 | 1.01 | 0 | 0.81 |
| Ex. 28 | Ex. 9 | 40 | EOCN4400H | 60 | Fused Silica | 305.5 | 1.01 | 0 | 0.81 |
| Ex. 29 | Ex. 10 | 38 | EOCN4400H | 62 | Fused Silica | 305.5 | 0 | 1.01 | 0.81 |
| Comp. Ex. 4 | Comp. Ex. 1 | 40 | EOCN4400H | 60 | Fused Silica | 305.5 | 1.01 | 0 | 0.81 |
| Ex. 30 | Ex. 7 | 30 | EOCN4400H | 70 | Fused Silica | 305.5 | 1.01 | 0 | 0.81 |
| Ex. 31 | Ex. 7 | 40 | EOCN4400H | 60 | Fused Silica | 305.5 | 1.01 | 0 | 1.85 |
| Comp. Ex. 5 | Comp. Ex. 1 | 40 | EOCN4400H | 60 | Fused Silica | 305.5 | 1.01 | 0 | 0.81 |
| Ex. 32 | Ex. 7 | 50 | MY9512 | 50 | GF | 100 | 2.00 | 0 | 4.04 |
| Comp. Ex. 6 | Comp. Ex. 1 | 50 | MY9512 | 50 | GF | 100 | 2.00 | 0 | 4.04 |

*1YX-4000H: trade name for biphenyl epoxy resin produced by Yuka Shell Epoxy Co., Ltd.
EOCN4400H: trade name for o-cresol novolak epoxy resin produced by Nippon Kayaku Kabushiki Kasisha
MY-9512: trade name for glycidylaminic tetrafunctional epoxy resin produced by Nippon Ciba Geigy Co., Ltd.
*2fused silica: CRS1102-RD8 (trade name), produced by Tatsumori Co., Ltd.
GF: short fiber ES-30T (trade name), manufactured by Unitika UM Glass Co., Ltd.
*3 2E4MZ: abbreviation of 2-ethyl-4-methylimidazole which is a curing accelerator (1st grade reagent) produced by Wako Pure Chemical Industries, Ltd.
*4 TPP; abbreviation of triphenylphosphine which is a curing accelerator (guaranteed reagent) produced by Kanto Chemical Co., Ltd.

TABLE 5

| Ex. & Comp. Ex. No. | Resin | Molding Condition Temperature (°C.) | Molding Condition Time (Sec.) | Postcure Condition Temperature (°C.) | Postcure Condition Time (Sec.) | Gelation Time 170° C. (Sec.) | Properties of Molding Glass Transition Temperature*5 (°C.) | Properties of Molding Linear Expansion Coefficient*6 ($10^{-5}$/°C.) |
|---|---|---|---|---|---|---|---|---|
| (I) | | | | | | | | |
| Ex. 11 | Ex. 1 | 175 | 90 | 175 | 6 | 58 | 149 | 1.89 |
| Ex. 12 | Ex. 2 | 175 | 90 | 175 | 6 | 148 | 152 | 1.96 |
| Ex. 13 | Ex. 3 | 175 | 90 | 175 | 6 | 60 | 158 | 1.96 |
| Ex. 14 | Ex. 4 | 175 | 90 | 175 | 6 | 52 | 158 | 1.96 |
| Ex. 15 | Ex. 5 | 175 | 90 | 175 | 6 | 43 | 149 | 1.96 |
| Ex. 16 | Ex. 6 | 175 | 90 | 175 | 6 | 43 | 165 | 1.96 |
| Ex. 17 | Ex. 7 | 175 | 90 | 175 | 6 | 40 | 148 | 1.96 |
| Ex. 18 | Ex. 8 | 175 | 90 | 175 | 6 | 32 | 152 | 1.93 |
| Ex. 19 | Ex. 9 | 175 | 90 | 175 | 6 | 40 | 148 | 1.94 |
| (II) | | | | | | | | |
| Ex. 20 | Ex. 10 | 175 | 90 | 175 | 6 | 47 | 125 | 2.00 |
| Comp. Ex. 2 | Comp. Ex. 1 | 175 | 90 | 175 | 6 | 315 | 142 | 2.32 |
| Ex. 21 | Ex. 1 | 175 | 90 | 175 | 6 | 50 | 156 | 1.86 |
| Ex. 22 | Ex. 1 | 175 | 90 | 175 | 6 | 50 | 155 | 1.68 |
| Ex. 23 | Ex. 7 | 175 | 90 | 175 | 6 | 40 | 156 | 1.86 |
| Ex. 24 | Ex. 7 | 175 | 90 | 200 | 6 | 40 | 173 | 1.78 |
| Comp. Ex. 3 | Comp. Ex. 1 | 175 | 90 | 200 | 6 | 315 | 166 | 2.01 |
| Ex. 25 | Ex. 7 | 175 | 90 | 175 | 6 | 36 | 182 | 1.90 |
| Ex. 26 | Ex. 7 | 175 | 90 | 175 | 6 | 28 | 170 | 1.87 |
| (III) | | | | | | | | |
| Ex. 27 | Ex. 8 | 175 | 90 | 175 | 6 | 32 | 175 | 1.85 |
| Ex. 28 | Ex. 9 | 175 | 90 | 175 | 6 | 28 | 172 | 1.82 |
| Ex. 29 | Ex. 10 | 175 | 90 | 175 | 6 | 38 | 145 | 1.80 |
| Comp. Ex. 4 | Comp. Ex. 1 | 175 | 90 | 175 | 6 | 96 | 164 | 2.55 |
| Ex. 30 | Ex. 7 | 175 | 90 | 200 | 6 | 36 | 213 | 1.52 |
| Ex. 31 | Ex. 7 | 175 | 90 | 200 | 6 | 28 | 207 | 1.77 |
| Comp. Ex. 5 | Comp. Ex. 1 | 175 | 90 | 200 | 6 | 96 | 181 | 1.88 |
| Ex. 32 | Ex. 7 | 175 | 90 | 175 | 6 | 38 | 186 | 3.12 |
| Comp. Ex. 6 | Comp. Ex. 1 | 175 | 90 | 175 | 6 | 72 | 172 | 3.73 |

*5Method: dynamic viscoelasticity method
Instrument: DVE RHEOSPECTOLER model DVE-4V, manufactured by Rheology Co., Ltd.
Loading method: tensile method
Frequency for measurement: 10 Hz
Temperature elevation rate: 5° C./min
Displacement in dynamic measurement: ±5 × $10^{-4}$ cm
Test piece: 4 mm in width, 1 mm in thickness, 30 mm in span
*6Instrument: TAS-200 System, model TMAS140C manufactured by Rigaku Co., Ltd.
Temperature elevation rate: 5° C./min
Length of test piece: 10 mm
Range of measuring temperature: 50 to 100° C.

What is claimed is:

1. A process for producing a highly reactive modified phenolic resin, comprising the steps of:

polycondensing a petroleum heavy oil or pitch, a formaldehyde polymer and a phenol in the presence of an acid catalyst to thereby prepare a modified phenolic resin; and reacting the resultant modified phenolic resin with a phenol in the presence of an acid catalyst and in the absence of crosslinking amounts of formaldehyde polymer to thereby lower the molecular weight of the modified phenolic resin.

2. The process for producing a highly reactive modified phenolic resin as claimed in claim 1, wherein, in the polycondensation step, a mixture containing the petroleum heavy oil or pitch and the formaldehyde polymer in a ratio of the number of moles, in terms of formaldehyde, of the formaldehyde polymer to that of the petroleum heavy oil or pitch of 1 to 15 is heated under agitation in the presence of an acid catalyst, and the phenol is gradually added to the mixture while being heated under agitation until a ratio of the number of moles of the phenol to that of the petroleum heavy oil or pitch of 0.5 to 5 to thereby effect the polycondensation of the petroleum heavy oil or pitch, the formaldehyde polymer and the phenol leading to the preparation of the modified phenolic resin.

3. The process for producing a highly reactive modified phenolic resin as claimed in claim 1 or 2, wherein the modified phenolic resin prepared in the polycondensation step is treated with a solvent containing at least one compound selected from the group consisting of aliphatic and alicyclic hydrocarbons each having up to 10 carbon atoms to thereby remove solvent-soluble components containing unreacted components, so that the modified phenolic resin is purified (i), and the thus purified modified phenolic resin is subjected to the molecular weight lowering step.

4. The process for producing a highly reactive modified phenolic resin as claimed in claim 1 or 2, wherein the modified phenolic resin prepared in the polycondensation step is treated with an extraction solvent capable of dissolving most of the modified phenolic resin but dissolving the acid catalyst employed in the polycondensation in a solubility of 0.1 or less to thereby extract and remove catalyst residue, so that the modified phenolic resin is purified (ii), and the thus purified modified phenolic resin is subjected to the molecular weight lowering step.

5. A molding material based on modified phenolic resin, comprising the highly reactive modified phenolic resin (A) obtained by the process as claimed in claim 1 and an epoxy resin (B).

6. The molding material based on modified phenolic resin as claimed in claim 5, which further comprises an inorganic filler (D).

7. The molding material based on modified phenolic resin as claimed in claim 5 or 6, wherein the highly reactive modified phenolic resin (A) and the epoxy resin (B) are mixed in a weight ratio of 10/90 to 90/10.

8. A material for electrical or electronic part produced by molding the molding material based on modified phenolic resin as claimed in claim 5.

9. A semiconductor sealer comprising the molding material based on modified phenolic resin as claimed in claim 5.

* * * * *

UNITED STATES PATENT AND TRADEMARK OFFICE
CERTIFICATE OF CORRECTION

PATENT NO. : 5,521,259
DATED : May 28, 1996
INVENTOR(S) : Masahiro TSUMURA, et al.

It is certified that error appears in the above-indentified patent and that said Letters Patent is hereby corrected as shown below:

Column 1, line 9, "thereby from" should read --thereby form--.

Column 4, line 19, Delete "25".

Column 10, line 33, "30 rain to 2.0 hr." should read --30 min to 2.0 hr.--.

Column 16, line 7, Delete "(Molecular Weight".
　　　　　line 8, "Lowering Step)" should read
--(Molecular Weight Lowering Step)--

Column 18, line 66, "a curing agent" should read --a curing accelerator--.

Column 19, line 9, "3 to 10 rain" should read --3 to 10 min--.

UNITED STATES PATENT AND TRADEMARK OFFICE
CERTIFICATE OF CORRECTION

PATENT NO. : 5,521,259
DATED : May 28, 1996
INVENTOR(S) : Masahiro TSUMURA, et al.

It is certified that error appears in the above-indentified patent and that said Letters Patent is hereby corrected as shown below:

Column 22, line 20, "Adaldite" should read --Araldite--.

Column 25, line 62, "crosslinking amounts" should read --crosslinking agent--.

Signed and Sealed this

Seventh Day of October, 1997

Attest:

BRUCE LEHMAN

Attesting Officer

Commissioner of Patents and Trademarks